United States Patent
Gord et al.

(10) Patent No.: US 6,797,100 B1
(45) Date of Patent: Sep. 28, 2004

(54) METHOD AND APPARATUS FOR THE MANUFACTURE OF A TUBE MADE OF FILM ON A CELLULOSE BASIS WHICH AN INSERT REINFORCES

(75) Inventors: Herbert Gord, Ingelheim (DE); Klaus-Dieter Hammer, Mainz (DE); Helmut Sattler, Wiesbaden (DE); Rainer Neeff, Wiesbaden (DE)

(73) Assignee: Kalle GmbH & Co. KG, Wiesbaden (DE)

( * ) Notice: Subject to any disclaimer, the term of this patent is extended or adjusted under 35 U.S.C. 154(b) by 0 days.

(21) Appl. No.: 09/787,416

(22) PCT Filed: Sep. 15, 1999

(86) PCT No.: PCT/EP99/06820
§ 371 (c)(1),
(2), (4) Date: Jun. 15, 2001

(87) PCT Pub. No.: WO00/16959
PCT Pub. Date: Mar. 30, 2000

(30) Foreign Application Priority Data

Sep. 24, 1998 (DE) .......................................... 198 43 723

(51) Int. Cl.$^7$ .......................... B29C 53/36; B29D 23/00
(52) U.S. Cl. .................. 156/156; 156/203; 156/244.13; 156/305; 156/322; 156/390; 156/466; 156/500; 156/578; 264/135; 264/187; 425/71; 425/72.1; 425/326.1
(58) Field of Search ................................. 264/135, 187, 264/189, 191, 190; 156/156, 202, 203, 244.13, 200, 217, 218, 244.11, 244.12, 244.14, 305, 396, 466, 500, 578, 322; 425/71, 72.1, 326.1

(56) References Cited

U.S. PATENT DOCUMENTS

| 2,105,273 A | * | 1/1938 | Smith ......................... 493/274 |
| 2,979,114 A | * | 4/1961 | Milne ......................... 156/466 |
| 3,645,760 A | | 2/1972 | O'Brien et al. |
| 4,164,536 A | | 8/1979 | Bentley |
| 4,401,136 A | | 8/1983 | Porrmann et al. |
| 5,658,525 A | * | 8/1997 | Kajiwara et al. ........... 264/560 |

FOREIGN PATENT DOCUMENTS

| DE | 1 952 464 | 5/1970 |
| DE | 39 07 951 | 10/1989 |
| DE | WO 95/07811 | 3/1995 |
| GB | 1042182 | 9/1966 |

* cited by examiner

Primary Examiner—Gladys JP Corcoran
(74) Attorney, Agent, or Firm—Connolly Bove Lodge & Hutz LLP

(57) ABSTRACT

The invention relates to a film tube (10) based on cellulose which is produced by extruding an aqueous cellulose-N-methyl-morpholine-N-oxide (NMMO) solution through a ring nozzle (21) onto a lining (3). The film tube (10) is manufactured by means of a vertically descending spinning in a spinning vat (12) in which a spinning bath (11) is located. The film tube (10) which is submerged in the spinning bath (11) passes through an air gap (9) between the underside of a nozzle block (7) and the upper surface of the spinning bath (11) and, internally, is pressurized, supported and slightly stretched in a transversal manner by compressed air. The film tube (10) is filled with an inner bath solution (31) via a supply tube (18). An idle roller (13) is situated near the bottom of the spinning vat (12) in order to guide the film tube (10) around and, afterwards, out of the spinning vat (12) in an upward sloping manner. The film tube is laid flat along a contact section (27) of the idle roller (13).

25 Claims, 4 Drawing Sheets

METHOD AND APPARATUS FOR THE MANUFACTURE OF A TUBE MADE OF FILM ON A CELLULOSE BASIS WHICH AN INSERT REINFORCES

BACKGROUND OF THE INVENTION

1. Field of the Invention

The invention relates to a method and an apparatus for the manufacture of a tube made of film on a cellulose basis, which an insert reinforces, by extruding an aqueous solution of cellulose-N-methyl-morpholin-N-oxide (NMMO) onto the insert, which is drawn from a roll and formed to a tube with an overlapping longitudinal seam.

2. Description of Related Art

Cellulose is not soluble in common solvents and has neither a melting point nor a melting range and therefore cannot be worked as a thermoplastic. For this reason cellulose is normally converted chemically for the manufacture of casings for foods, such as sausage casings, this process involving a degradation of the cellulose, i.e., the average degree of fit polymerization of the cellulose is lower. Such methods are technically very complicated and accordingly expensive to practice.

Presently the viscose method is preferred in the extrusion of film tubes on a cellulose basis. The cellulose is reacted with caustic soda solution and then reacted with carbon disulfide. Thus, a cellulose xanthate solution is obtained, which is extruded through a spinning or ring nozzle into a so-called spin bath or coagulating bath. The cellulose is regenerated by means of additional coagulating baths and washing baths.

It has long been known that cellulose is soluble in oxides of tertiary amines, and that at present the most appropriate solvent for cellulose is N-methyl-morpholin-N-oxide (NMMO). The cellulose dissolves therein, without changing chemically. No breakdown of cellulose chains takes place. The preparation of appropriate spinning solutions is known (DD 218 104; DD 298 789; U.S. Pat. No. 4,145,532, U.S. Pat. No. 4,196,282, U.S. Pat. No. 4,255,300).

Filaments can be made from the solutions by extrusion into a spin bath (DE-A 44 09 609; U.S. Pat. No. 5,417,909). In WO 95/07811 (=CA 2,149,218) there is also disclosed a method for the preparation of cellulose tubular films by the aminoxide method. What is distinctive of this method is the cooling of the extruded film with a cooling gas immediately under the ring gap of the extrusion nozzle. According to EP A 662 283, the extruded tubular film is cooled from within by a liquid.

Recovery and purification of the NMMO are described in DD 274 435. Since the cellulose is not chemically converted in the process the apparatus cost is lower. In the aminoxide method no gaseous or aqueous waste products are produced, so that there are no problems with exhausts or waste water. It is therefore acquiring increasing importance.

In EP-A 0 686 712 the production of flexible cellulose fibers by the N-methylmorpholin-N-oxide-(NMMO) is described. In it a cellulose solution in aqueous NMMO is forced through a spinneret, carried across an air gap into an aqueous coagulating bath containing NMMO and then washed, finish-treated and dried.

According to WO 93/13670 a seamless, tubular food casing is made by extruding a solution of cellulose in NMMO/water by means of a special extrusion die. Between the extrusion die and the coagulating bath there is an air gap. Distinctive of this method is an especially formed hollow mandrel through which the coagulating liquid can circulate also inside of the tube. In the air gap the interior of the extruded tube is filled virtually completely with the hollow mandrel and the coagulating liquid. The tube is not stretched transversely.

In WO 95/35340 a method is described for the production of cellulose blowing films in which a non-derivatized cellulose dissolved in NMMO is used.

Document GB-A 1,042,182 describes a method for the production of a film tube on a cellulose basis reinforced by an insert by extruding a cellulose-NMMO solution onto the insert, the insert being drawn from a roll. The insert is formed into a tube with an overlapping longitudinal seam, the seam not being cemented. This tube is treated inside and out with a viscose solution.

Document DE-A 1 952 464 describes an apparatus for coating and imbibing a paper tube with polyvinyl alcohol resin. The paper tube is formed from a paper web. A cementing apparatus for cementing the overlapping longitudinal seam is not provided. Neither is any preheating of the paper web before it is coated with the polyvinyl alcohol resin performed.

In the document WO-A 95/07811 an apparatus is described for the production of tubes by extruding a cellulose-NMMO solution. The tubes are pure cellulose casings, but not so-called fiber casings in which a fiber insert strengthens the tube. The apparatus for the production of the tube is designed so that the tube can be cooled inside and out with air, so that the NMMO solution solidifies rapidly. The cooling air is by no means supporting air that is introduced into the interior of the film tube.

In the state of the art, methods and apparatus are known for the production of a fiber-reinforced cellulose tube by the viscose process, but these methods and apparatus are not applicable in NMMO technology for the following reasons:

Different temperatures of the spinning solutions

Different viscosities of the spinning solutions

Different solvents

Different sensitivities to evaporation and dilution, temperature fluctuations, and different temperature limits.

Usually the cellulose in the viscose process is spun in the temperature range of 20 to 45° C. Instead, the extrusion temperature of cellulose NMMO solutions is around 85 to 115° C.

The viscosity of cellulose in the viscose process is about 10 to 30 Pas, and that of NMMO solutions 10 to 300 Pas, especially 20 to 200 Pas. Cellulose in the viscose process reacts with caustic soda solution and then with carbon disulfide, while the NMMO solutions are organic solutions.

SUMMARY OF THE INVENTION

The invention is therefore addressed to the problem of designing a method and an apparatus so that they will be suitable for coating inserts formed into a tube with cellulose NMMO solutions and permit a uniform penetration of the inserts with cellulose-NMMO solutions.

This problem is solved by the invention in that the tube passes through a heating section situated ahead of the nozzle block and in communication therewith, in which the insert is preheated with hot air to the temperature of the extruded cellulose-NMMO solution, then the seam is cemented with straight NMMO or cellulose-NMMO solution and the tube is then carried through the nozzle block in which the cellulose-NMMO solution is applied to the tube and penetrates it to obtain an insert-reinforced film tube, that the interior of the film tube is filled with an aqueous NMMO solution, and that the film tube exits the nozzle block and enters a spin bath, is turned around in the latter, and is carried out of it.

DETAILED DESCRIPTION OF A PREFERRED EMBODIMENT

In an embodiment of the process, after it is drawn from the roll, emulsifiers, wetting agents and/or anchoring agents are applied by one of the known methods such as roller application. An appropriately pressure-controlled supporting air is blown into the interior of the film tube after it leaves the nozzle block.

As the process continues, the film tube is carried through a heated annular gauging disk through which a heating medium flows in a controlled circuit.

In embodiment of the process, aqueous NMMO solution is delivered into the interior of the film tube and also removed therefrom, the delivery and removal being performed at a distance apart from one another. At the same time the level of delivery of the aqueous NMMO solution in the film tube is adjustable and its removal is performed such that the level in the film tube is variably up to 20 mm higher and up to 45 mm lower than the level in the spin bath.

The rest of the process is to be found in the features of claims 7 to 12.

As a variant of this process it is also possible, instead of passing through a tub filled with the spin bath, to apply the spin bath directly internally and externally onto the film tube, through ring nozzles for example, as is described in EP-A0 006 601. The spin bath level is then lowered inside and out to the top edge of the spin tub's deflector roll.

The apparatus for producing a film tube on a cellulose basis, which the insert reinforces, by extruding an aqueous cellulose-N-methyl-morpholin-N-oxide-(NMMO) solution onto the insert, with a nozzle block and a spin bath, is characterized in that a supply roll for the insert, a deflector roll, and a forming section in which the insert is formed into a tube with an overlapping longitudinal seam, are present, that a preheating system for the tube is disposed ahead of the nozzle block, that the preheating system is connected by hot air ducts and an exhaust duct is connected with a controllable heater out of which air heated in the circuit flows into the preheating system, and from which cooled air flows back into the heater, and that the tube runs through the nozzle block which is preceded by a cementing system for cementing the longitudinal seam of the tube and which contains a ring nozzle out of the nozzle gap of which the cellulose-NMMO solution is applied to the tube preheated to the temperature of the extrusion solution in order to complete the formation of the film tube.

In further embodiment of the apparatus, the insert is selected from the group, paper, nonwoven, fiber fleece, fiber paper, the fibers being especially long hemp fibers.

In embodiment of the apparatus, after the insert is drawn from the supply roll an applicator system is attached, with which additives such as emulsifiers, wetting and/or anchoring agents can be applied to the insert and can be dried in the following hot open air section.

It is also possible that the preheating system is not required in every case, so that in certain manufacturing procedures it remains shut off.

In an embodiment of the invention, the nozzle block contains a ring nozzle which is heated by a heating medium, and a delivery tube and a removal tube for the aqueous NMMO solution, plus a duct for supporting air for the film tube, are brought centrally through an annular gauging disk which is arranged concentrically with the ring nozzle in the interior of the film tube and forms with the latter an annular gap through which the film tube passes.

The annular gauging disk is connected with the heating circuit for heating.

In embodiment of the apparatus, the infeed tube and the outfeed tube are adjustable for height within the film tube.

The further configuration of the apparatus will be apparent from the features of claims 19 to 25.

By the method of the invention a substantially uniform penetration of the insert with the cellulose-NMMO solution, so that, after passing through additional treatment steps, such as precipitation or coagulation baths, a composite of a fiber-reinforced film tube is obtained which has improved properties for its use. The fiber-reinforced film tube on a cellulose-NMMO basis corresponds in its properties to the known cellulose fiber or fiber casings which are made from cellulose hydrate and reinforced with wet-strengthened fibers of cellulose (=cellulose fiber fleece).

The invention is further explained below with the aid of the drawings, wherein.

Figure 1:
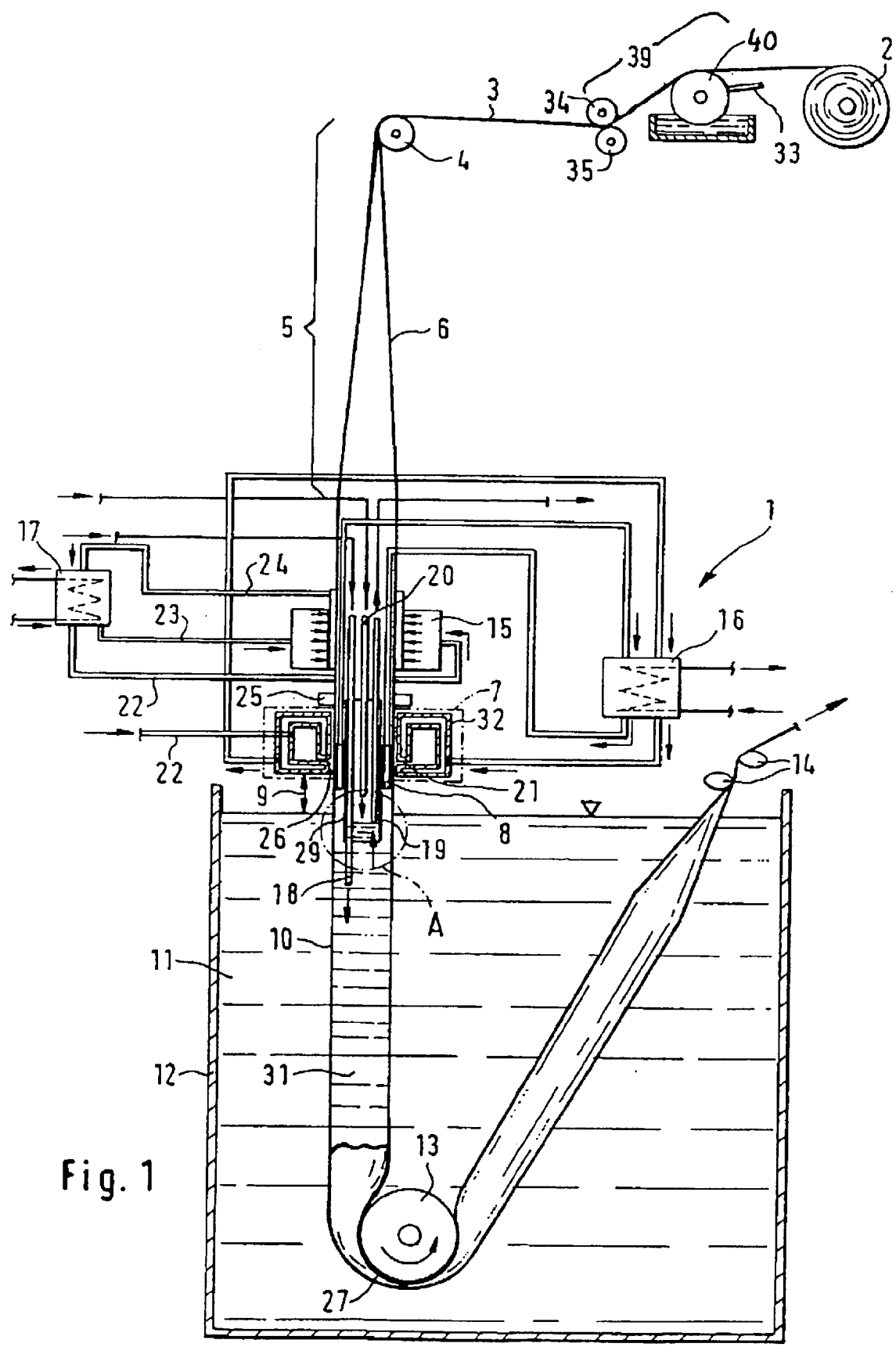
FIG. 1 is a schematic sectional view of the apparatus according to the invention with a height-adjusted infeed tube in the film tube.

An apparatus 1 shown in FIG. 1 for extruding an aqueous cellulose-N-methyl-morpholin-N-oxide (NMMO) solution onto an insert comprises a supply roll 2 for the insert 3, a deflector roll 4, a shaping section 5, a nozzle block 7 with a ring nozzle and a spin tub 12 which is filled with a spinning or precipitation bath 11.

The insert 3, which is paper, nonwoven, fiber paper or fiber fleece wherein the fibers are preferably hemp fibers, is drawn from the supply roll 2 and carried over the deflector roll 4. The fiber paper and the fiber fleece are solidified wet when manufactured, by being impregnated with dilute viscose, cellulose acetate solution or plastic washes. In these embodiments the insert 3 is used with preference. Ahead of the deflector roll 4 is an applicator 39 comprising a grid cylinder 40, a squeegee 33 and a pair of pinch rolls 34–35 for the application of additives, such as emulsifiers, wetting agents or sticking agents, to the insert 3. After the insert 3 passes over the deflector roll 4 the formation of a tube 6 with an overlapping longitudinal seam 38 (see FIG. 4a) takes place in the shaping section 5 by means of a forming shoulder not shown.

The tube 6 and the film tube 10 which it forms is made by a vertically descending spinning. For this, the tube 6 passes through the ring nozzle 21 in the nozzle block 7 through the gap of which the cellulose-NMMO solution is extruded onto the envelope 6 to complete the formation of the film tube 10. First the longitudinal seam on the envelope 6 is cemented ahead of the nozzle block 7 by a cementing system 25 shown more in detail in FIGS. 4a and 4b; straight NMMO or cellulose-NMMO solutions serve as the adhesive at temperatures between 15 and 110° C., especially the temperature of the cellulose-NMMO solution that is to be applied.

The extruded cellulose-NMMO solution coats and penetrates uniformly through the tubular envelope 6. The pressure required for penetration is built up by the geometry of the annular gap 26 in the nozzle body 7, which amounts to 0.1 to 5 mm, especially 0.5 to 1.5 mm. The annular gap 26 is formed by a gauging disk 8 and the inside of the annular nozzle 21.

After exiting from the nozzle body 7 the film tube 10 passes through an air section 9 before it plunges into the spin bath 11 in the spin tub 12. In the air section 9 a temperature treatment with temperature-controlled air can take place if necessary, in which case heated air delays the solidification of the cellulose-NMMO solution and cool air accelerates it.

Instead of the one-sided application of the cellulose-NMMO solution to the outside of the envelop 6, the cellulose-NMMO solution can also be applied bilaterally, i.e., both to the outside and to the inside of the envelope 6.

Figure 2:
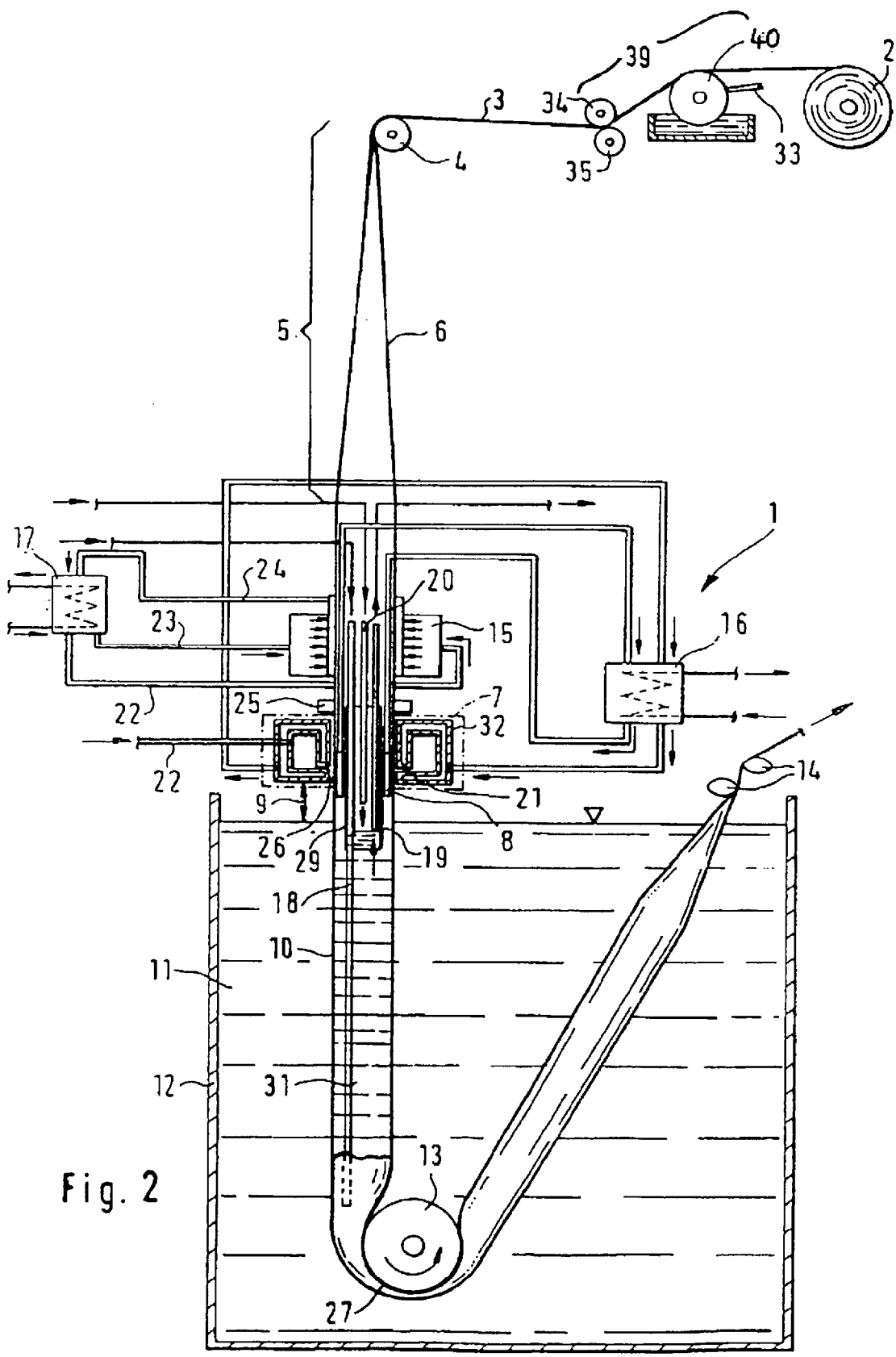
FIG. 2 is a schematic sectional view of an apparatus similar to that of FIG. 1, with infeed tube lowered into the film tube.

The ring nozzle 21 serves as the outer ring nozzle, while the inner ring nozzle takes the place of the gauging disk 8 in FIGS. 1 and 2. The inner ring nozzle is, like the gauging ring disk 8, beatable. In this variant of the treatment, the outer and inner cellulose-NMMO solution filmcan be applied spaced apart from one another, i.e., delayed in time.

The spin bath 11 consists of an aqueous NMMO solution with an NMMO content 5 to 50 weight-percent, especially 8 to 20 weight-percent. A preheating system 15 is arranged in front of the nozzle block 7 and connected to a controlled heater 17 by hot air ducts 22 and 23 and an exhaust duct 24. The aqueous spinning solution extruded from the ring nozzle 21 is a cellulose-NMMO solution with a morpholine content of 75 to 90 wt.-%, especially 87.7 wt.-%. The spinning solution is fed on one side into the ring nozzle 21 by means of a spinning pump, not shown, and distributed in a largely uniform manner over the circumference through a nozzle gap through a distributor plate, not shown. The ring nozzle 21 has a double jacket 32 for heating the ring nozzle 21 to the temperature of the morpholine solution, a heating medium being provided for the purpose, which flows through the double jacket 32 and is heated in a controlled heating circuit 16 which is connected by lines to the double jacket 32. The film tube 10 extruded from the nozzle block 7 passes through the air section 9 in which it is expanded by compressed air and stretched slightly crosswise. The expanded film tube 10 has no contact with the outside of a tube 29 which extends downward past the bottom of the nozzle block 7. The air section amounts to 1 to 1000 mm, especially 200 to 500 mm. The tube 29 surrounds an inlet and outlet tube 18 and 19, respectively, for an internal bath solution 31 which fills the film tube 10. This internal bath solution is an aqueous NMMO solution with an NMMO content of 5 to 50 wt.-%, especially 8 to 20 wt.-%. The inlet and outlet tubes 18 and 19 extend vertically downward into the film tube 10 plunging into the spin bath 11. As the feeding of the internal bath solution 31 into the film tube 10 begins, the inlet tube 18 assumes a raised position, as shown in FIG. 1. As soon as the film tube is filled with the internal bath solution, the inlet tube 18 is advanced to a position in the film tube 10 which is just above the deflector roll 13 for the film tube 10, as can be seen in FIG. 2. The inlet tube 18 can be raised and lowered within the vertically plunging film tube 10, and so can the outlet tube 19.

Air at a pressure of 0.1 to 10 mbar above atmospheric is passed through a line 20 for supporting air into the interior of the film tube 10. This pressure produces a slight expansion of the inflated film tube in the air section 9 directly following its exit from the nozzle block 7. The film tube 10 plunging into the spin bath 11 is turned around near the bottom of the spin tube 12. A deflector roll 13 is provided, which is powerdriven, and around which the film tube 10 is passed. After the film tube turns around it is brought up through the spin bath 11 and out of the bath at an angle. The film tube 10 running upward at an angle is pinched together by the spin bath pressure just underneath the surface of the spin bath and is driven in the flattened state out of the spin bath 11. Wipers 14 on both sides of the collapsed film tube 10 wipe away the excess spin bath solution. The width of the flattened film tube 10 is kept as constant as possible. Any departure of the width of the flattened film tube 10 from the desired dimension results in a readjustment of the tension applied to the film tube in order to maintain the specified dimension.

FIG. 2 differs from FIG. 1 only in that the inlet tube 18 is inserted so far down into the vertically descending film tube 10, in comparison to FIG. 1, that the mouth of the inlet tube is situated just above the deflector roll 13. The spin bath 11 and the internal bath solution 31 are, as mentioned previously, aqueous NMMO solutions which, as the extrusion of the film tube 10 begins, have the same NMMO concentration. As extrusion progresses, the NMMO concentration of the inner bath solution 31 will increase, since morpholine penetrates the insert 3 during the cellulose regeneration, and enters into the internal bath solution 31 and concentrates therein. Since morpholine has a greater density than water, the concentration or density of the NMMO solution increases toward the deflector roll 13 inside of the film tube 10. The concentration of the NMMO solution in the spin bath 31 varies hardly at all, since the morpholine yielded by the film tube to the spin bath 11 can increase the NMMO concentration of the spin bath 11 to only a negligible degree. In the inside bath solution 31 in the film tube 10, unless the NMMO concentration in the inside bath solution 31 is regulated, different coagulation conditions might occur, as well as a variation of the diameter of the film tube 10. Due to the constant delivery and removal of the inside bath solution 31 through the delivery and removal tube 18 and 19, respectively, a constant renewal of the inside bath solution 31 occurs, i.e., the inside bath solution 31 enriched with morpholine near the deflector roll 13 is diluted, so that the NMMO concentration of the inside bath solution 31 near the deflector roll 13 is less than or at most equal to the NMMO concentration of the spin bath 11. The tension applied to the film tube 10, together with the pressure of the spin bath 11, is enough to urge the film tube 10 against the deflector roll 13 along the line of contact 27 so that it is more or less flattened, as can be seen in FIGS. 1 and 2. Thus, uniform pressure conditions are established in the film tube over the entire length from just beneath the surface of the spin bath 11 to an area close to the deflector roll 13, so that the gauge or diameter of the film tube 10 is constant and shows no fluctuation or narrowing. The density of the inside bath solution 31 is thus dependent upon the throughput of the inside bath solution or morpholine solution, the amount of the inside bath and the depth of immersion of the inlet tube 18 or the point at which fresh morpholine solution is fed into the inside bath solution. The position or point at which the inside bath solution 31 flows into the film tube 10 substantially influences the gauge constancy, the level of the inside bath in the ascending film tube 10 after the deflector roll 13 and the location for the removal of the inside bath solution 31 from the interior of the film tube.

Figure 3:
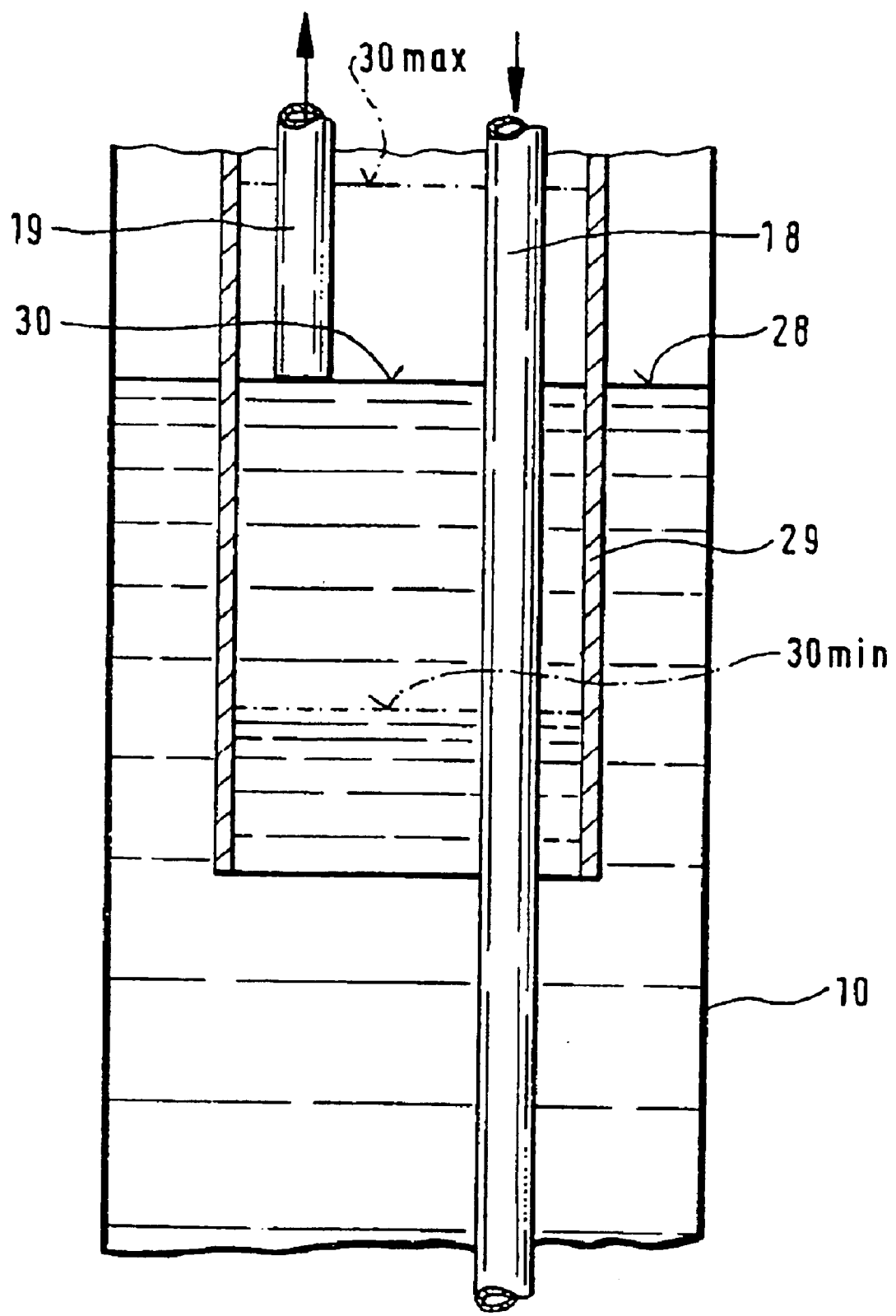
FIG. 3 is an enlarged sectional view at point A in FIG. 1.

FIG. 3 shows on an enlarged scale the section indicated at A in FIG. 1. The tube 29 is lowered about 50 to 100 mm into the inside bath solution in the film tube. The aspirating tube 19 is in a position in which it establishes a level 30 inside of the tube 29, which is up to 20 mm higher or 45 mm lower than an inside bath level 28 of the inside bath solution of the film tube 10.

In other words, this means that the aspirating tube 19 assumes a position at which the inside bath solution is drawn up to a distance of as much as 20 mm higher or 45 mm lower than the tube level 28. The highest and the lowest tube levels 30 are indicated by broken lines $30_{max}$ and $30_{min}$ in FIG. 3. The aspiration usually starts below the level of the spin bath 11, so that the air section 9 situated above it and the pressure conditions there prevailing have no influence on the inside bath solution and thus cannot produce any gauge fluctuations in the film tube 10, either. If the aspiration is performed above the level of the spin bath 11, the effect of the pressure conditions in the air section 9 on the film tube 10 is negligible, since the latter is made stable in shape by the insert to the extent that it is hardly subject to any gauge variations.

Due to the adjustment of the depth of immersion of the inlet tube 18 and the constant renewal of the inside bath solution the density of the inside bath solution 31 is kept at a uniform level, which results in a constriction of the film tube 10 along the line of contact 27 with the deflector roll 13 and keeps the level of the inside bath solution 31 in the ascending film tube 10 constant for as long as desired with respect to the surface of the spin bath 11, so that irregular running and film tube gauge variations no longer occurs. The constant renewal and the minimum delivery of inside bath solution 31 are to be determined individually for each rate of extrusion or output of the film tube.

The film tube 10 emerging from the spin bath 11 then passes through precipitation and washing tubs not shown, and can also be treated with plasticizers, for example, and then dried before being wound up and further treated.

In a variation of the method, the level of the spin bath 11 inside and outside of the film tube is lowered to the upper edge of the deflector roll 13 and the film tube 10 can be sprayed inside and out with the spin bath through ring nozzles, as described, for example, in EP-A 0 006 601.

Figure 4A:
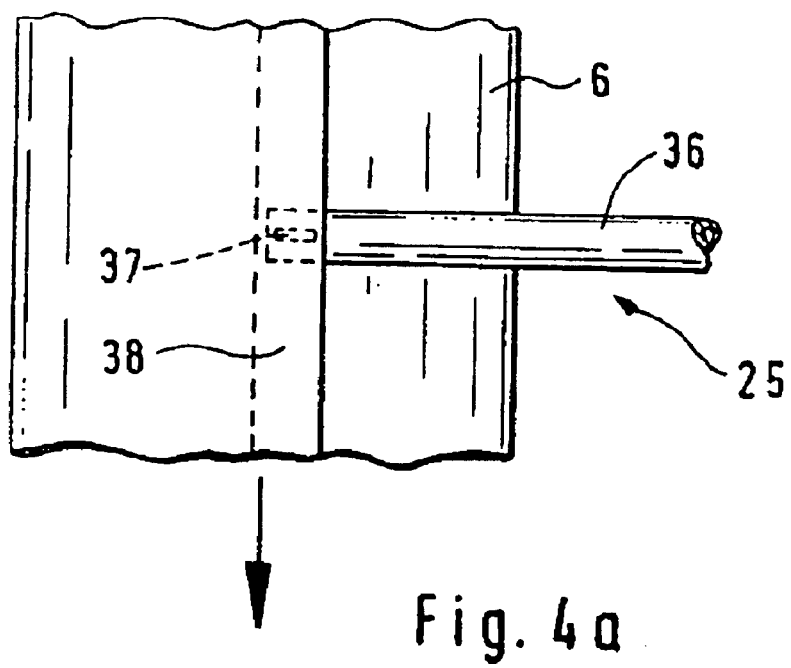
FIGS. 4a and 4b are side and top views of a cementing device for a tubular envelope, formed from an insert.
Figure 4B:
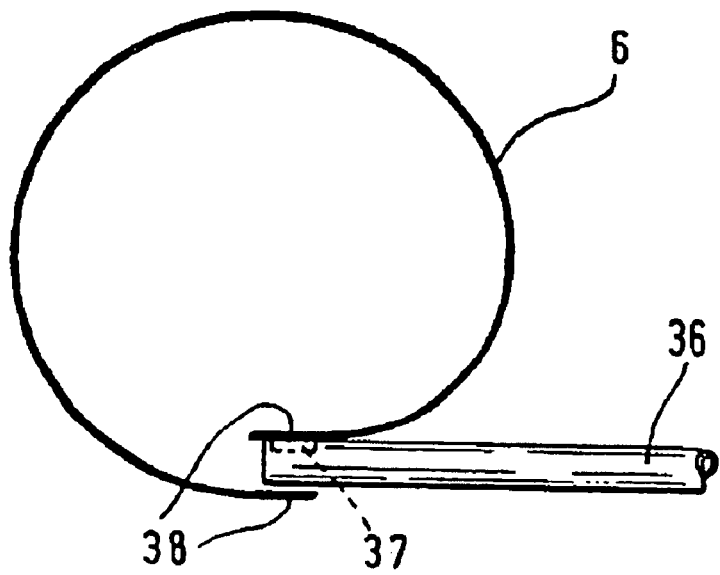

In FIGS. 4a and 4b, a side view and top view of the cementing system 25 are shown schematically. The cementing system 25 comprises a hollow, fixed finger 36 with a slit 37 from which the cement flowing inside of the finger 36 is applied to the longitudinal seam 38 of the tubular envelope 6. The envelope 6 is simultaneously moving vertically in the direction of the arrow to the finger 36.

The film tube 10 can be expanded alternatively or additionally to the supporting air through a tube, a ring or a spreader in flat form, free of wrinkles.

Besides the treatment of the film tube 10 in the spin bath 11, as described in FIGS. 1 to 4b, with complete immersion of the film tube in the spin bath, wherein the tube interior is filled with an inside bath for pressure equalization, and the inside bath level 28 can be regulated differently from the tube level 30 in the tube 29 or by the outside level of the spin bath 11, it is also possible, in the case of the previously described bilateral coating with cellulose-NMMO solution, a film of NMMO solution can be applied to the outside as well as to the inside of the film tube 10 by means of an outer and inner annular ring nozzle.

What is claimed is:

1. A method for the production of a film tube on a cellulose basis, which is strengthened by an insert, involving:

extruding an aqueous cellulose-N-methyl-morpholine N-oxide (NMMO) solution onto the insert, comprising drawing said insert from a roll and forming said insert into a tube with an overlapping longitudinal seam, preheating the tube is with hot air to a temperature that is based on a corresponding temperature of the extruded cellulose-NMMO solution, cementing the seam of the preheated tube with pure NMMO or cellulose-NMMO solution, allowing the tube with the cemented seam to be carried through a nozzle block in order to extrude the cellulose-NMMO solution on to the tube and penetrate it, such that an insert-reinforced film tube is obtained, and wherein the interior of the film tube is filled with an aqueous NMMO solution, and allowing the film tube to exit from the nozzle block and enter into a spin bath.

2. Method according to claim 1, wherein emulsifiers, wetting agents and/or anchoring agents are applied.

3. Method according to claim 1, wherein pressure-regulated supporting air is blown into the interior of the film tube after departure from the nozzle block.

4. Method according to claim 1, wherein the film tube is carried through a heated annular gauging disk through which a heating medium flows in a controlled circuit.

5. Method according to claim 1, wherein the aqueous NMMO solution is delivered through the nozzle block into the interior of the film tube and also removed therefrom, the delivery and removal being performed at a distance apart from one another.

6. Method according to claim 5, wherein the level of the delivery of the aqueous NMMO solution is adjustable and that the removal is performed such that the level in the film tube is variably higher by up to 20 mm and lower by up to 45 mm than a corresponding level in the spin bath.

7. Method according to claim 1, wherein the film tube, after leaving the nozzle block, runs through an air section until it enters into the spin bath, and that in the air section an external temperature treatment takes place which regulates the rate of solidification of the cellulose-NMMO solution of the film tube.

8. Method according to claim 1, wherein the film tube plunges vertically into the spin bath and with maintenance of a constant tension is turned about by a powered return roll running close to the bottom of the spin bath tube and is carried out upwardly at an angle from the spin bath.

9. Method according to claim 1, wherein the spin bath level inside and outside of the film tube is lowered as far as the upper edge of a return roll and that the film tube; is sprayed inside and out with the spin bath.

10. Method according to claim 1, wherein the longitudinal seam of the tubular envelope is cemented with straight NMMO or cellulose-NMMO solution at a temperature of 15 to 110° C.

11. Method according to claim 1, wherein the cellulose content of the extruded cellulose-NMMO solution amounts to 1 to 15 wt. %, with respect to the total solution, and that the average degree of polymerization ranges from 250 to 800.

12. Method according to claim 1, wherein the aqueous NMMO solution of the spin bath has an NMMO concentration of 5–50 wt.-% and that the spin bath is adjusted to 0 to 50° C.

13. An Apparatus for producing a film tube on a cellulose basis, reinforced by an insert, formed by extruding an aqueous cellulose-N-methylmorpholine-N-oxide (NMMO) solution onto the insert, said apparatus comprising:

a nozzle block, a spin bath, a supply roll for the insert, a deflector roll, and a forming section for forming the insert into a tube with an overlapping longitudinal seam, said apparatus further comprising a preheating system disposed ahead of the nozzle block, the preheating system being connected in said apparatus by hot air ducts, said apparatus further comprising and an exhaust duct connected to a controllable heater from which heated air flows into the preheating system and from which cooled air flows back into the controllable heater, and wherein the preheated tube is capable of passing through a cementing system for cementing the longitudinal seam and then through the nozzle block which contains an annular nozzle from whose nozzle gap the cellulose-NMMO solution is applied to the preheated and cemented tube that has been preheated to the temperature of the extrusion solution for the formation of the film tube.

14. Apparatus for the production of a film tube according to claim 13, wherein said apparatus is capable of being used with an insert selected from the group consisting of paper, nonwoven, fiber fleece, fiber paper, long hemp fiber fleece and long hemp fiber paper.

15. Apparatus for the production of a film tube according to claim 13, wherein said apparatus further comprises an applicator system such that after drawing the insert from the supply roll said applicator system being capable of applying additives to the insert and said insert being capable of being dried in the preheating system.

16. Apparatus for the production of a film tube according to claim 13, wherein the nozzle block comprises a ring nozzle which is heated by a heating medium, flowing through a controllable heating circuit connected by lines to a double jacket of the ring nozzle, and that a delivery tube, a removal tube and a duct for supporting the film tube with air are brought centrally through a gauging ring disk which is arranged concentrically with the ring nozzle in the film tube interior and forms with the latter an annular gap from which the film tube runs through an air section into a spin bath within a spin tube.

17. Apparatus for the production of a film tube according to claim 16, wherein the gauging ring disk is connected to a heating circuit for the purpose of heating.

18. Apparatus for the production of a film tube according to claim 16, wherein the delivery tube and the removal tube are individually height-adjustable within the film tube.

19. Apparatus for the production of a film tube according to claim 16, wherein the delivery tube is disposed in an upper position at the beginning of the delivery of the aqueous NMMO solution into the film tube and at the start of continuous operation, said delivery tube assumes a position above a return roll near a lower portion of the spin tube.

20. Apparatus for the production of a film tube according to claim 16, characterized in that the heating medium flows through the ring nozzle and is carried in a controlled heating circuit (16).

21. Apparatus for the production of a film tube according to claim 16, wherein the air section amounts to 1 to 1000 mm, such that the film tube can be heated to delay its solidification or cooled to accelerate its solidification in the air section.

22. Apparatus for the production of a film tube according to claim 19, wherein the return roll disposed near said lower portion of the spin tube is driven and exerts a constant tension on the film tube when said film tube is descending vertically.

23. Apparatus for the production of a film tube according to claim 22, wherein said apparatus is capable of facilitating that the film tube lies flat against the return roll along a line of contact as a result of the tension exerted on the film tube.

24. Apparatus for the production of a film tube according to claim 13, wherein said apparatus is capable of facilitating that the spin bath and the aqueous NMMO solution in the film tube have equal NMMO concentrations at the beginning of the extrusion of the film tube.

25. Apparatus for the production of a film tube according to claim 13, wherein said is capable of facilitating that excess pressure of supporting air in the film tube amounts to 0.1 to 10 mbar in the range of an air section.

* * * * *